(12) United States Patent
Vanheule et al.

(10) Patent No.: US 11,027,708 B2
(45) Date of Patent: Jun. 8, 2021

(54) PEDAL ASSEMBLY WITH A RELEASE MECHANISM

(71) Applicant: KSR IP Holdings, LLC, Wilmington, DE (US)

(72) Inventors: Steven Vanheule, Highgate (CA); Matthew Vyskocil, Ridgetown (CA); Nack Sung, Chatham (CA)

(73) Assignee: KSR IP Holdings, LLC, Wilmington, DE (US)

( * ) Notice: Subject to any disclaimer, the term of this patent is extended or adjusted under 35 U.S.C. 154(b) by 0 days.

(21) Appl. No.: 16/855,704

(22) Filed: Apr. 22, 2020

(65) Prior Publication Data

US 2020/0339078 A1 Oct. 29, 2020

Related U.S. Application Data

(60) Provisional application No. 62/837,467, filed on Apr. 23, 2019.

(51) Int. Cl.
*B60T 7/06* (2006.01)
*G05G 1/323* (2008.04)
*B60R 21/09* (2006.01)

(52) U.S. Cl.
CPC .............. *B60T 7/065* (2013.01); *B60R 21/09* (2013.01); *G05G 1/323* (2013.01)

(58) Field of Classification Search
CPC ................................ B60T 7/065; G05G 1/323
See application file for complete search history.

(56) References Cited

U.S. PATENT DOCUMENTS

| 6,453,737 B2 | 9/2002 | Young et al. |
| 7,775,555 B2 | 8/2010 | Allen et al. |
| 7,987,743 B2 | 8/2011 | Sukonthapanich |

(Continued)

FOREIGN PATENT DOCUMENTS

| CN | 104709249 B | 4/2017 |
| EP | 1557330 B1 | 12/2006 |

(Continued)

OTHER PUBLICATIONS

International Search Report dated Jul. 31, 2020; International Application PCT/US2020/029322.

*Primary Examiner* — Vicky A Johnson
(74) *Attorney, Agent, or Firm* — Dinsmore & Shohl LLP

(57) ABSTRACT

Embodiments described herein are directed to a pedal assembly. The pedal assembly includes a housing, a pedal arm, a retaining member, and a block. The pedal arm has an upper end. The upper end is pivotally coupled to the housing. The retaining member is slidably engaged within the housing. The retaining member has a first angled portion. A portion of the retaining member in communication with the upper end of the pedal arm. The block is slidably mounted within the housing and perpendicular to the first angled portion of the retaining member. The block has a second angled portion that is complimentary to the first angled portion. Upon an impact, the second angled portion slidably engages with the first angled portion, which causes the retaining member to move and release the upper end of the pedal arm from the housing.

20 Claims, 14 Drawing Sheets

(56) References Cited

U.S. PATENT DOCUMENTS

| | | | |
|---|---|---|---|
| 9,010,216 B2 * | 4/2015 | Burguera Albizuri | ....................... B60T 7/065 74/560 |
| 9,213,354 B2 | 12/2015 | O'Neill | |
| 9,523,998 B2 | 12/2016 | Sukonthapanich | |
| 2005/0172754 A1 | 8/2005 | Strole | |
| 2013/0220061 A1 | 8/2013 | O'Neill | |
| 2014/0060239 A1 | 3/2014 | Hemmege Venkatappa et al. | |
| 2015/0232072 A1 | 8/2015 | Periasamy et al. | |
| 2017/0101079 A1 * | 4/2017 | Kawaguchi | ............... B60T 7/06 |
| 2019/0322250 A1 * | 10/2019 | Jarjoura | ................. G05G 1/327 |

FOREIGN PATENT DOCUMENTS

| | | |
|---|---|---|
| JP | 5126037 B2 | 1/2013 |
| KR | 20050046132 A | 5/2005 |

* cited by examiner

PEDAL ASSEMBLY WITH A RELEASE MECHANISM

CROSS REFERENCE TO RELATED APPLICATIONS

This application claims priority of U.S. Provisional Application 62/837,467 filed Apr. 23, 2019, the contents of which is included herein by reference.

TECHNICAL FIELD

This present specification generally relates to pedal assemblies and, more specifically to a pedal assembly having release assembly features during an impact.

BACKGROUND

During a front end impact of a vehicle, the momentum of the vehicle will project the driver towards the front of the vehicle. This will force the driver's leg and foot into the pedal pad with great force. Therefore, it would be desirable to produce a pedal assembly which releases the pedal away from the driver's leg and foot.

SUMMARY

In one embodiment, a pedal assembly is provided. The pedal assembly includes a housing, a pedal arm, a retaining member, and a block. The pedal arm has an upper end that is pivotally coupled to the housing. The retaining member is slidably engaged within the housing. The retaining member has a first angled portion. A portion of the retaining member in communication with the upper end of the pedal arm. The block is slidably mounted within the housing and perpendicular to the first angled portion of the retaining member. The block has a second angled portion that is complimentary to the first angled portion. Upon an impact, the second angled portion of the block slidably engages with the first angled portion, which causes the retaining member to move and release the upper end of the pedal arm from the housing.

In another embodiment, a pedal assembly having impact features is provided. The pedal assembly includes a housing, a pedal arm, a retaining member, and a block. The housing has a slot, a cavity, and a channel. The pedal arm has an upper end that is pivotally coupled to the housing within the channel. The retaining member is slidably engaged with the slot and positioned at least partially within the housing. The retaining member has a first angled portion. The retaining member is in communication with the upper end of the pedal arm. The block is slidably mounted within the cavity of the housing and positioned perpendicular to the retaining member. The block has a second angled portion that is complimentary to the first angled portion. Upon an impact, the second angled portion of the block slidably engages with the first angled portion which causes the retaining member to move within the slot and releases the upper end of the pedal arm from the channel of the housing.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
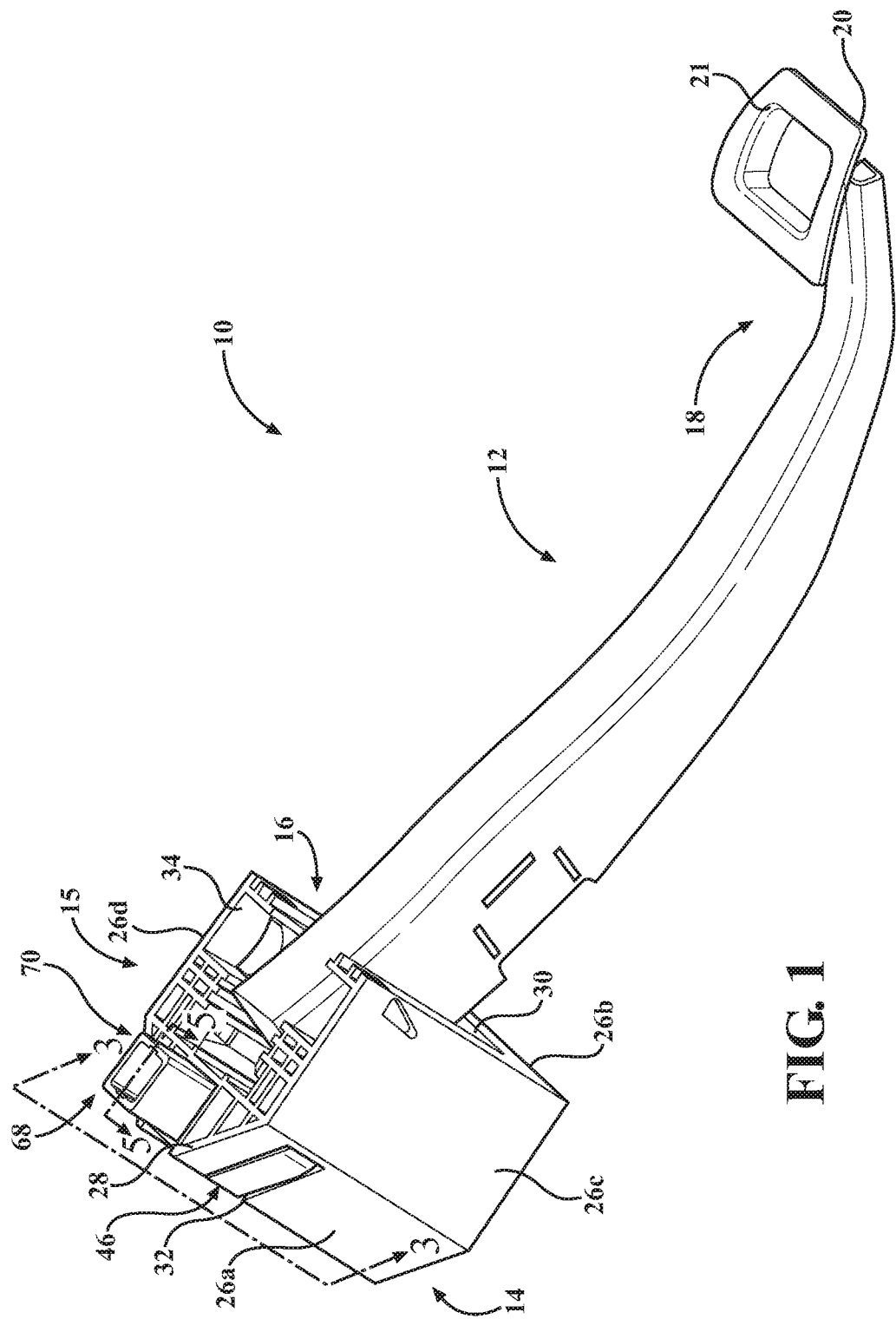
FIG. 1 schematically depicts a perspective view of a first example pedal assembly according to one or more embodiments shown and described herein.
Figure 2:
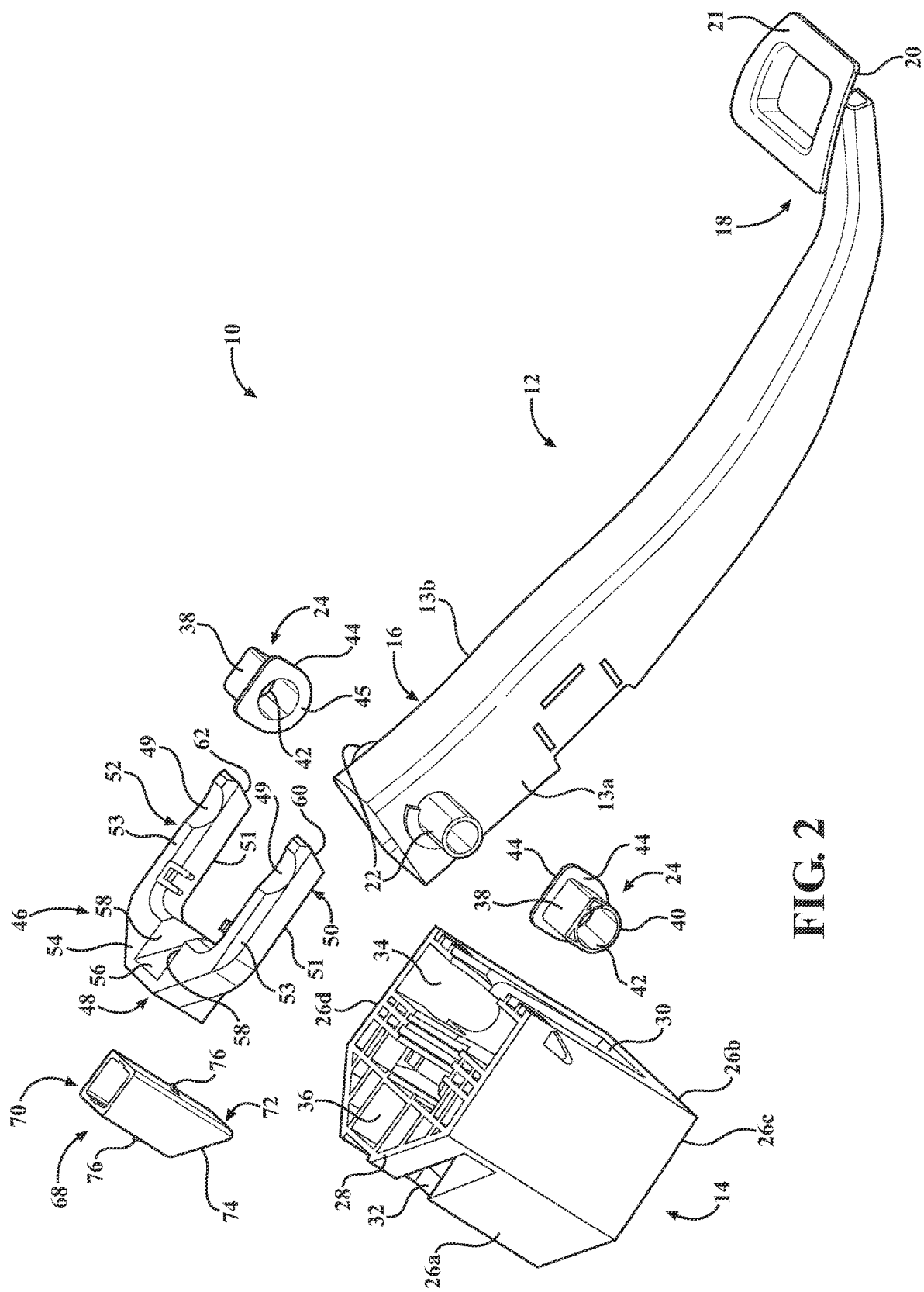
FIG. 2 schematically depicts an exploded view of the first example pedal assembly of FIG. 1 according to one or more embodiments shown and described herein.
Figure 3:
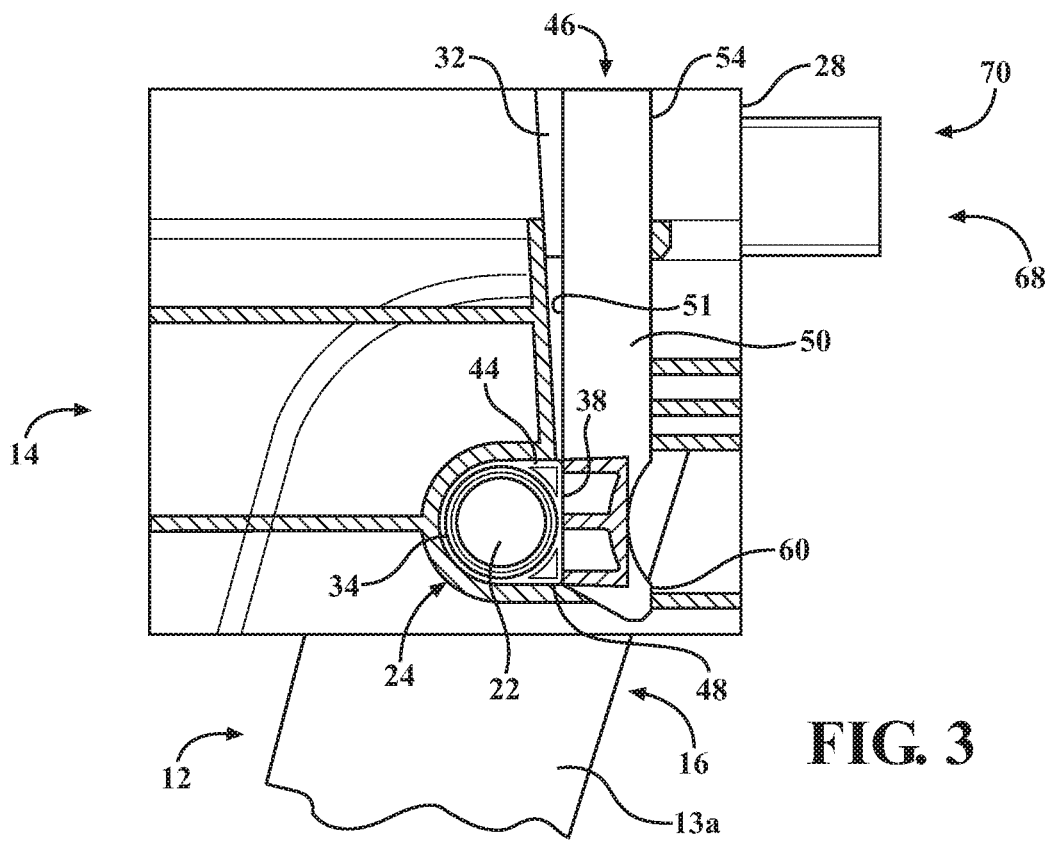
FIG. 3 schematically depicts a partial cross sectional view of the first example pedal assembly of FIG. 1 taken from line 3-3 according to one or more embodiments shown and described herein.
Figure 4:
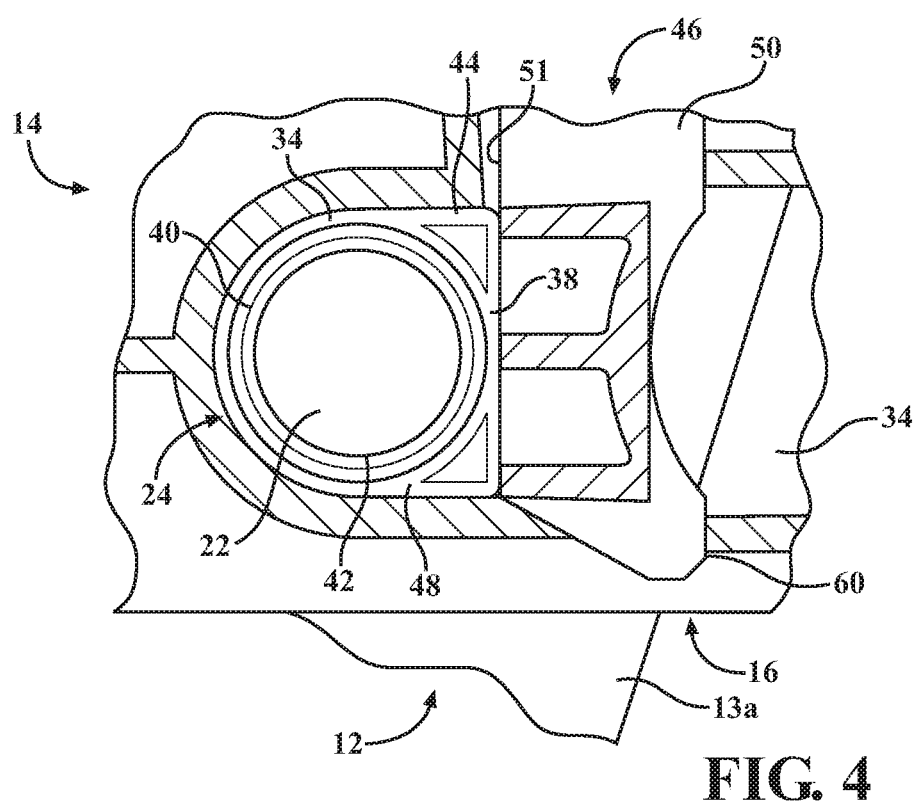
FIG. 4 schematically depicts an isolated cross sectional view of a bushing and a protrusion of the first example pedal assembly of FIG. 3 according to one or more embodiments shown and described herein.

Embodiments of the present disclosure are directed to a pedal assembly with a release mechanism having a plurality of components that mechanically disengage an upper portion of a pedal arm from a housing to allow the upper portion of the pedal arm to pivot out of the housing upon a vehicle impact. As such, the pedal arm is moved from an operational position to a disengaged position, in which the operational position is a normal position for the pedal arm and the disengaged position is where the pedal arm is moved from an undesirable position to a desirable position during the vehicle impact. In some embodiments, the desirable position during an impact may be out of the housing and on a floorboard of the vehicle.

The release mechanism includes a retaining member, a block and a pair of bushings. The retaining member includes a base portion, a first leg and a second leg spaced apart by the base portion. The base portion includes a first angled surface. The retaining member is pivotally engaged within the housing and the first and second legs are in communication with the upper end of the pedal arm via the pair of bushings. The block is slidably mounted within the housing. The block includes a second angled portion that is complimentary to the first angled portion. Upon the vehicle impact, the second angled portion of the block slidably engages with the first angled portion, which causes the first and second legs of the member to pivot and/or cam and to release the pair of bushings and the upper end of the pedal arm from the housing. As such, the upper portion of the pedal arm is moved from an undesirable position during a vehicle impact to a desirable position.

The pedal assembly may be a fly by wire, organ pedal style, accelerator pedal assembly, combination pedal assembly, adjustable pedal assembly, and the like. Various embodiments of the pedal assembly and the operation of the pedal assembly will be described in more detail herein.

Referring now to FIGS. 1-5, a first example pedal assembly 10 is schematically depicted. The first example pedal assembly 10 includes a pedal arm 12, a housing 14, and a release mechanism 15. The release mechanism 15 includes a pair of bushings 24, a retaining member 46, and a block 68, as described in further detail herein.

The pedal arm 12 includes an upper portion 16 and an opposite lower portion 18. A pedal pad 20 is coupled to the lower portion 18. The pedal pad 20 has an elongated top surface 21 adapted to receive a foot of a driver. The upper portion 16 is in communication with the housing 14. In some embodiments, the upper portion 16 of the pedal arm 12 acts as a living hinge with respect to the housing 14 such that the upper portion 16 pivots with respect to the housing 14 when a force is applied on the pedal pad 20, such as one caused by a driver's foot/leg. In some embodiments, the upper portion 16 of the pedal arm 12 includes a pair of protrusions 22 extending from each side surface 13a, 13b of the pedal arm 12. In other embodiments, the upper portion 16 of the pedal arm 12 includes a pair of recesses within each side surface 13a, 13b of the pedal arm 12. In some embodiments, the pedal arm 12 is made of a metal material such as Aluminum Alloy, Titanium, Carbon fiber, Chromyl steel, and the like. In other embodiments, the pedal arm 12 is made of a polymeric-based composite. It should be appreciated that the pedal arm 12 may be a brake pedal, a clutch pedal, an accelerator pedal of a vehicle, and/or any other pedal in any type of vehicle that may be involved in an impact.

The housing 14 includes a rear wall 26a an opposite front wall 26b, a pair of sidewalls 26c, 26d extending between the rear wall 26a and the front wall 26b and an upper surface 28. In some embodiments, the upper surface 28 is an open top surface. That is, the upper surface 28 does not have a planar wall surface. In some embodiments, portions of the rear wall 26a and/or the upper surface 28 is configured to be coupled to the vehicle such as to a portion of a firewall and/or to a portion of the instrument panel. The front wall 26b includes an elongated notch 30 that generally extends a length to the upper surface 28 such that a travel of the pedal arm 12 is accommodated. The rear wall 26a includes a slot 32 that generally extends in a lateral direction between the pair of sidewalls 26c, 26d and towards the front wall 26b. The upper surface 28 of the housing includes a channel 34 extending across the upper surface 28 and between the pair of sidewalls 26c, 26d. In some embodiments, the channel 34 is a pair of separate channels. The upper surface 28 further includes a cavity 36 that is positioned above the slot 32 in a vertical direction. As such, the cavity 36 is positioned adjacent to the rear wall 26a. In some embodiments, the channel 34 and/or the cavity 36 extend in a direction that is perpendicular to the direction that the slot 32 extends.

In some embodiments, a housing 14 may be a molded plastic material such as a glass reinforced polypropylene. In other embodiments, the housing 14 may be a thermoplastic such as polypropylene, ABS, polyoxymethylene, polycarbonate, nylon, polymers such as PVC, acrylic (PMMA), Polyether ether ketone (PEEK), polystyrene, combinations thereof, and/or the like.

In some embodiments, the upper portion 16 of the pedal arm 12 is pivotally attached to the housing 14 via the pair of bushings 24 that are independent of the housing 14 and coupled to the pair of protrusions 22. The pair of bushings 24 each include an upper surface 38 and a lower surface 40 forming an aperture 42. In some embodiments, the upper surface 38 is planar and the lower surface 40 is semi-circular. In other embodiments, the upper surface 38 may be arcuate and the lower surface 40 may be other shapes such as hexagonal, triangular, rectangular, and the like. Further, each of the pair of bushings 24 may include a flange portion 44 that extends beyond the upper surface 38 and the lower surface 40. In some embodiments, an interior surface 45 of the flange portion 44 is in communication with each side surface 13a, 13b of the pedal arm 12.

In some embodiments, the pair of bushings 24 and the pair of protrusions 22 are positioned within the channel 34 when the first example pedal assembly 10 is in an operational position, as best seen in FIG. 1. That is, a portion of the lower surface 40 and a portion of the flange portion 44 of the pair of bushings 24 are positioned in communication with the channel 34 to restrict or keep the pair of bushings 24 stationary within the channel 34 and permit the pair of protrusions 22 to rotate within the aperture 42 of the pair of bushings 24. As such, the pedal arm 12 may travel the length of the elongated notch 30 such that the pedal arm 12 pivots within the housing 14 during operation. In some embodiments, the pair of bushings 24 are keyed at or adjacent to the flange portion 44 to prevent the pair of bushings from rotating within the channel 34 and/or from binding in the channel 34.

In some embodiments, each one of the pair of bushings 24 may be a molded plastic material such as a hostraform material. In other embodiments, each one of the pair of bushings 24 may be a thermoplastic such as polyoxymethylene (POM), also known as acetal, polypropylene, ABS, polyoxymethylene, polycarbonate, nylon, polymers such as PVC, acrylic (PMMA), Polyether ether ketone (PEEK), polystyrene, combinations thereof, and/or the like.

The first example pedal assembly 10 further includes the retaining member 46 that slidably engages within the slot 32 of the housing 14. In some embodiments, the retaining member 46 is generally a "U" shape or a fork shape. In this embodiment, the retaining member 46 includes a base portion 48 that separates or spaces apart a first leg 50 from a second leg 52. The base portion 48 includes an upper surface 54 having a first angled portion 56 or a first ramp. Further, the first angled portion 56 is recessed within the upper surface 54 of the base portion 48 such that the first angled portion 56 is positioned to create a pair of angled walls 58. In some embodiments, the pair of angled walls 58 may serve as a guide, as discussed in greater detail herein.

In some embodiments, the first leg 50 and the second leg 52 extend from the rear wall 26a towards the front wall 26b when positioned within the housing 14 such that at least a distal end 60, 62 of each of the first leg 50 and the second leg 52 is positioned within the channel 34. It should be appreciated that in the operational position, the distal ends 60, 62 of each of the first leg and second legs 50, 52 are in communication with the upper surface 38 with each respective bushing of the pair of bushings 24. That is, each of the first leg and second legs 50, 52 includes an interior surface 51 and an exterior surface 53 that define a thickness. In some embodiments, the exterior surface 53 of the first leg and second legs 50, 52 includes an indention 49. In other embodiments, the exterior surface 53 of the first leg and second legs 50, 52 is planar.

In the operational position, at least the distal ends 60, 62 of each of the first leg and second legs 50, 52 retain the pair of bushings 24 into the channel 34 of the housing 14. That is, in the operational position, at least the interior surface 51 of the distal ends 60, 62 of each of the first leg and second legs 50, 52 rest on the upper surface 38 of each respective bushing of the pair of bushings 24. This arrangement retains the pair of bushings 24 and the upper portion 16 of the pedal arm 12 within the channel 34 of the housing 14 while permitting the pedal arm 12 to pivot along the length of the elongated notch 30 during operation. In some embodiments, each exterior surface 53 of the first leg and second legs 50, 52 has an indention 64 adjacent to the distal ends 60, 62 of each of the first leg and second legs 50, 52.

In other embodiments, the retaining member 46 includes a pair of separate legs that independently retain a respective bushing of the pair of bushings 24. In this embodiment, the base portion may independently be in communication with the pair of separate legs.

The first example pedal assembly 10 further includes the block 68 that is slidably received within the cavity 36 of the housing 14. That is, the block 68 is dimensionally shaped to be received in the cavity 36 of the housing 14. The block 68 includes a first end 70 and an opposite second end 72. The first end 70 of the block 68 extends above the upper surface 28 of the housing 14 in the vertical direction when the first example pedal assembly 10 is in the operational position. Further, the first end 70 is configured to receive an impact to depress the block 68 within the cavity 36 of the housing 14. As such, the first end may be reinforced with a honey-comb like structure to prevent deformation and/or other stress from changing or modifying the block 68. In some embodiments, the first end 70 has a greater surface area than the second end 72 such that there is a larger target for impact. Further, it should be appreciated that the first end 70 may be any uniform shape such as a rectangular, triangle, hexagon, octagon, and the like, and/or any irregular shape.

In some embodiments, the block 68 may be a molded plastic material such as a plastic material, a resin material, and the like. In other embodiments, the block 68 may be a thermoplastic such as polypropylene, ABS, polyoxymethylene, polycarbonate, nylon, polymers such as PVC, acrylic (PMMA), Polyether ether ketone (PEEK), polystyrene, combinations thereof, and/or the like. In yet other embodiments, the block 68 may be a metal such as a steel, aluminum, iron, and the like. As such, in some embodiments, it should be appreciated that the block 68 may absorb an impact and transfer that force onto the retaining member 46, as discussed in greater detail herein. In other embodiments, the block 68 may transfer the impact force onto the retaining member 46.

Figure 9:
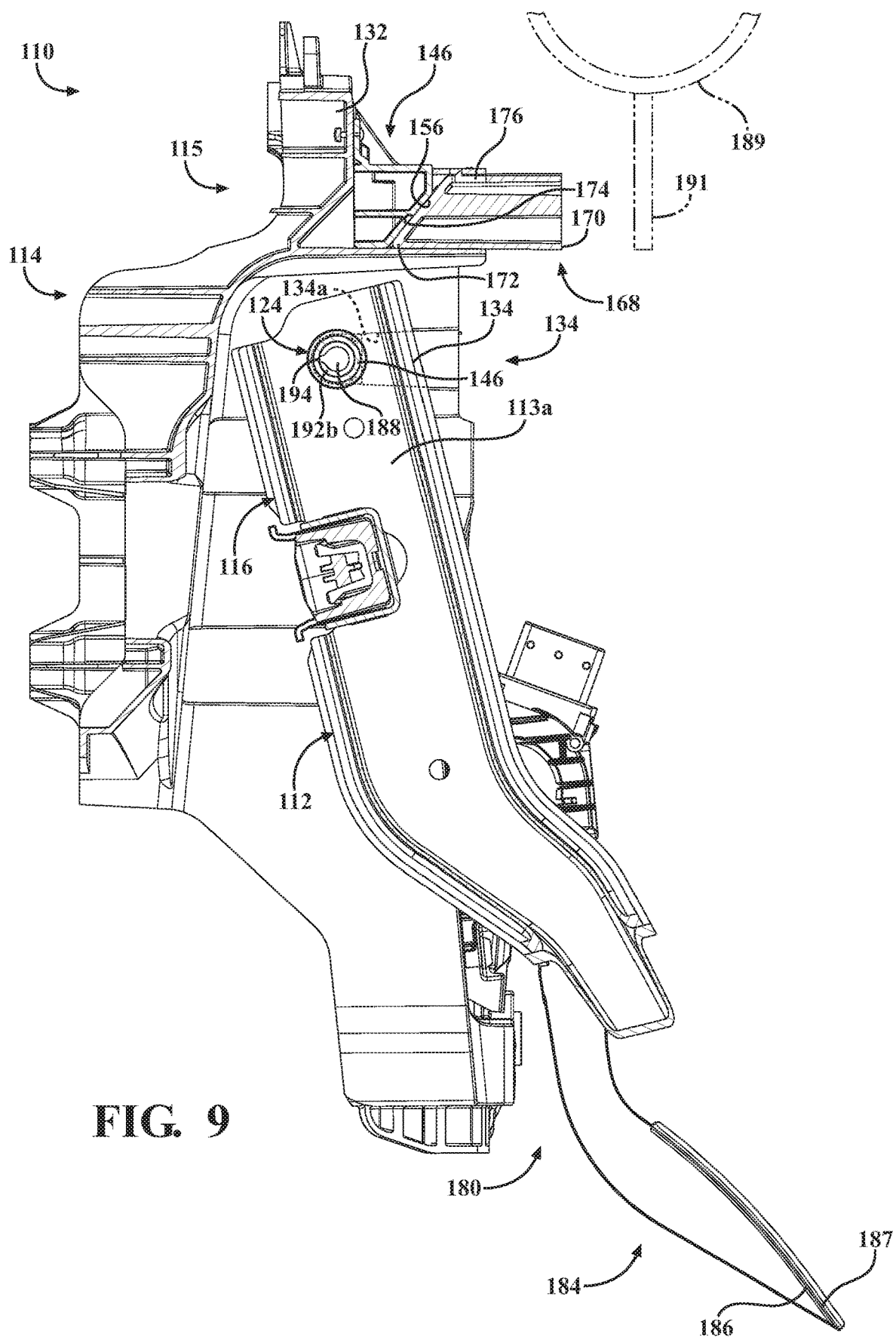
FIG. 9 schematically depicts a partial cross sectional view of the second example pedal assembly of FIG. 6 taken from line A-A in an operational position according to one or more embodiments shown and described herein.

Further, the first end 70 may be positioned within an instrument panel 189 (FIG. 9) of the vehicle such that upon a vehicle impact, the instrument panel, or a portion thereof, contacts with the first end 70 of the block 68. In some embodiments, a flag 191 (FIG. 10) may make contact with the first end 70 of the block 68 to depress the block 68 within the cavity 36 of the housing 14.

Figure 5:
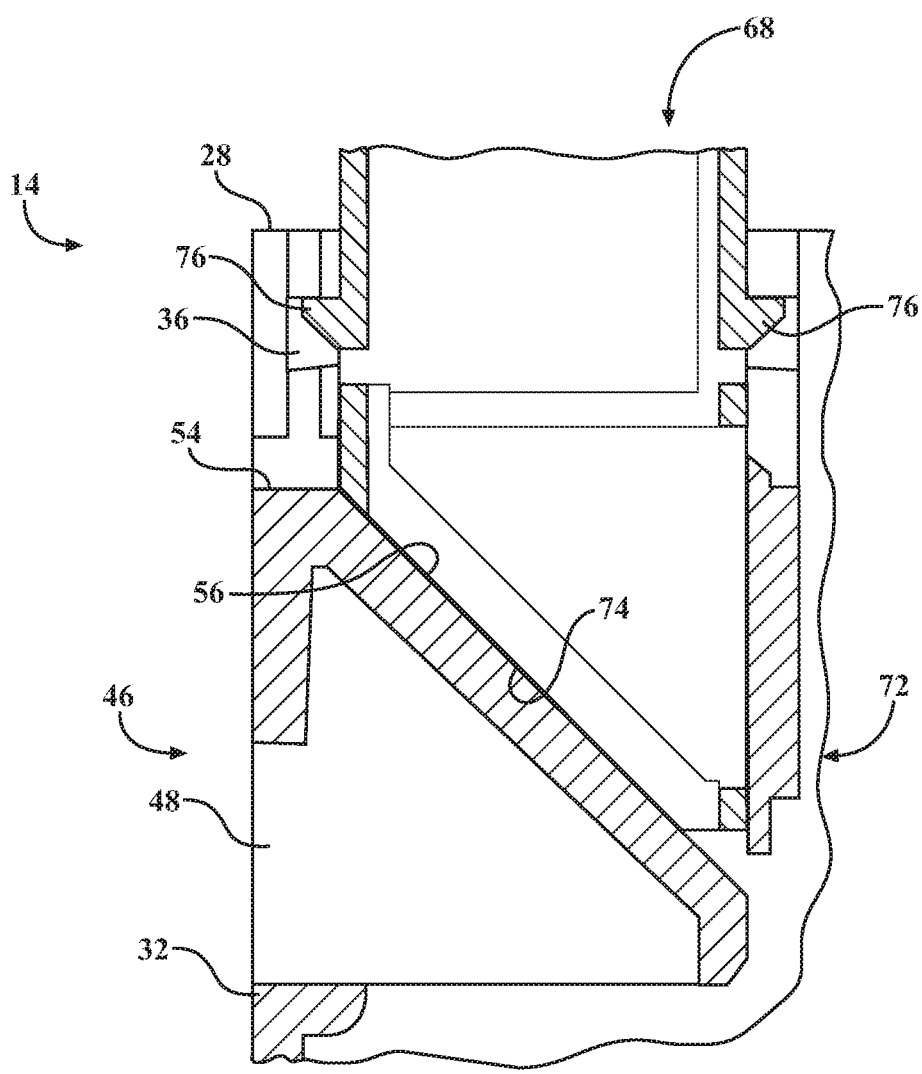
FIG. 5 schematically depicts a partial cross sectional view of a first angled portion of a retaining member and a second angled portion of a block of the first example pedal assembly of FIG. 1 taken from line 5-5 according to one or more embodiments shown and described herein.

The second end 72 includes a second angled portion 74. The second angled portion 74 is complimentary to the first angled portion 56, as best shown in FIG. 5. As such, it should be appreciated that the second end 72 of the block 68 may be installed perpendicular to the retaining member 46 such that the second angled portion 74 is positioned directly above the first angled portion 56 in the vertical direction so to align the first angled portion 56 with the second angled portion 74. It should be appreciated that the angle of the first angled portion 56 and the second angled portion 74 is calculated by a stroke of the block 68 and the retaining member 46. In a non-limiting example, the first angled portion 56 may be at a 45 degree angle and the second angled portion 74 may be at 45 degrees. Thus, a ride surface or the complementary surfaces of the first angled portion 56 and the second angled portion 74 that slidably engage with one another in this example are 45 degrees.

As such, the block 68 and the retaining member 46 may have complementary 45 degree angled surfaces. However, it should be appreciated that the angles of the first angled portion 56 and the second angled portion 74 (i.e., the ride surface or the complimentary angled surfaces) may be larger or smaller than 45 degrees. It should also be understood that in the operational position, the block 68 and the retaining member 46 are positioned within slot 32 and the cavity 36 of the housing 14 respectively. A portion of the first and second angled surfaces 56, 74 are in contact with one another such that the block 68 is positioned orthogonal to the retaining member 46. The angled walls 58 and the cavity 36 create a four way hold on the block 68. Further, both the retaining member 46 and the block 68 have retention tabs 76 positioned between the first and second ends 70, 72 to prevent the block 68 from backing out of the housing 14 prior to the application of an appropriately high force that would occur during the vehicle impact, as discussed in greater detail herein.

Upon a depression of the first end 70 of the block 68, the second angled portion 74 rides along the first angled portion 56 guided by the angled walls 58 to pivot or cam the retaining member 46 away from the upper surface 38 of the pair of bushings 24, which allows the pair of bushings 24 and the upper portion 16 of the pedal arm 12 to pivot out of the channel 34 into the disengaged position. That is, upon an impact of the first end 70 of the block 68, the second angled portion 74 of the second end 72 slidably engages with the first angled portion 56 of the retaining member 46, which causes the retaining member 46 to pivot and/or cam within the slot 32 and releases the pair of bushings 24 and the upper portion 16 of the pedal arm 12 from the channel 34 of the housing 14. In some embodiments, the pivoting or cam of the retaining member 46 causes the first and second legs 50, 52 to displace such that the first and second legs 50, 52, such that the pair of bushings 24 and the upper portion 16 of the pedal arm 12 within the channel 34 are released when the driver continues to apply a force onto the pedal pad 20 of the pedal arm 12.

Now referring to FIGS. 6-10, a second example pedal assembly 110 is schematically depicted. It is understood that the second example pedal assembly 110 is similar to the first example pedal assembly 10 with the exceptions of the features described herein. As such, like features will use the same reference numerals with a prefix "1" for the reference numbers. As such, for brevity reasons, these features will not be described again.

The second example pedal assembly 110 is a fixed combination pedal assembly that includes a first pedal arm 112, a housing 114, a release mechanism 115 and a second pedal arm 180. In some embodiments, the first pedal arm 112 may be a brake pedal and the second pedal arm 180 may be an accelerator pedal. It should be appreciated that this is a non-limiting example and the first pedal arm 112 may be a clutch pedal and the second pedal arm 180 may be a brake pedal, and the like. The second pedal arm 180 includes an upper portion 182 and an opposite lower portion 184. A pedal pad 186 is coupled to the lower portion 184. The pedal pad 186 has an elongated top surface 187 adapted to receive a foot of a driver. The upper portion 182 is in communication with the housing 114. In some embodiments, the upper portion 182 of the second pedal arm 180 acts as a living hinge with respect to the housing 114 such that the upper portion 182 pivots with respect to the housing 114 when a force is applied on the pedal pad 186, such as one caused by a driver's foot/leg.

Figure 13:
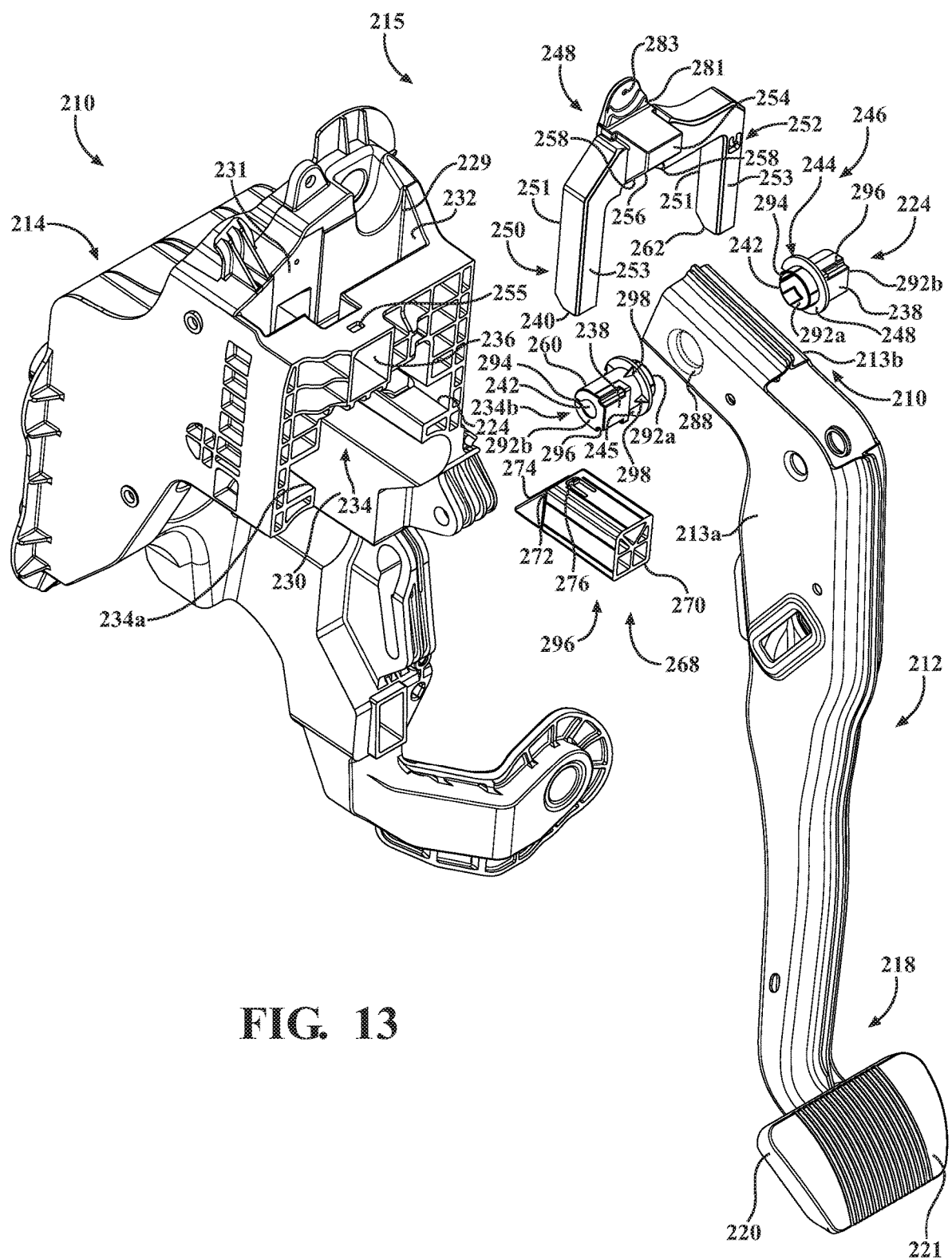
FIG. 13 schematically depicts a partial exploded view of the third example pedal assembly of FIG. 10 according to one or more embodiments shown and described herein.
Figure 14:
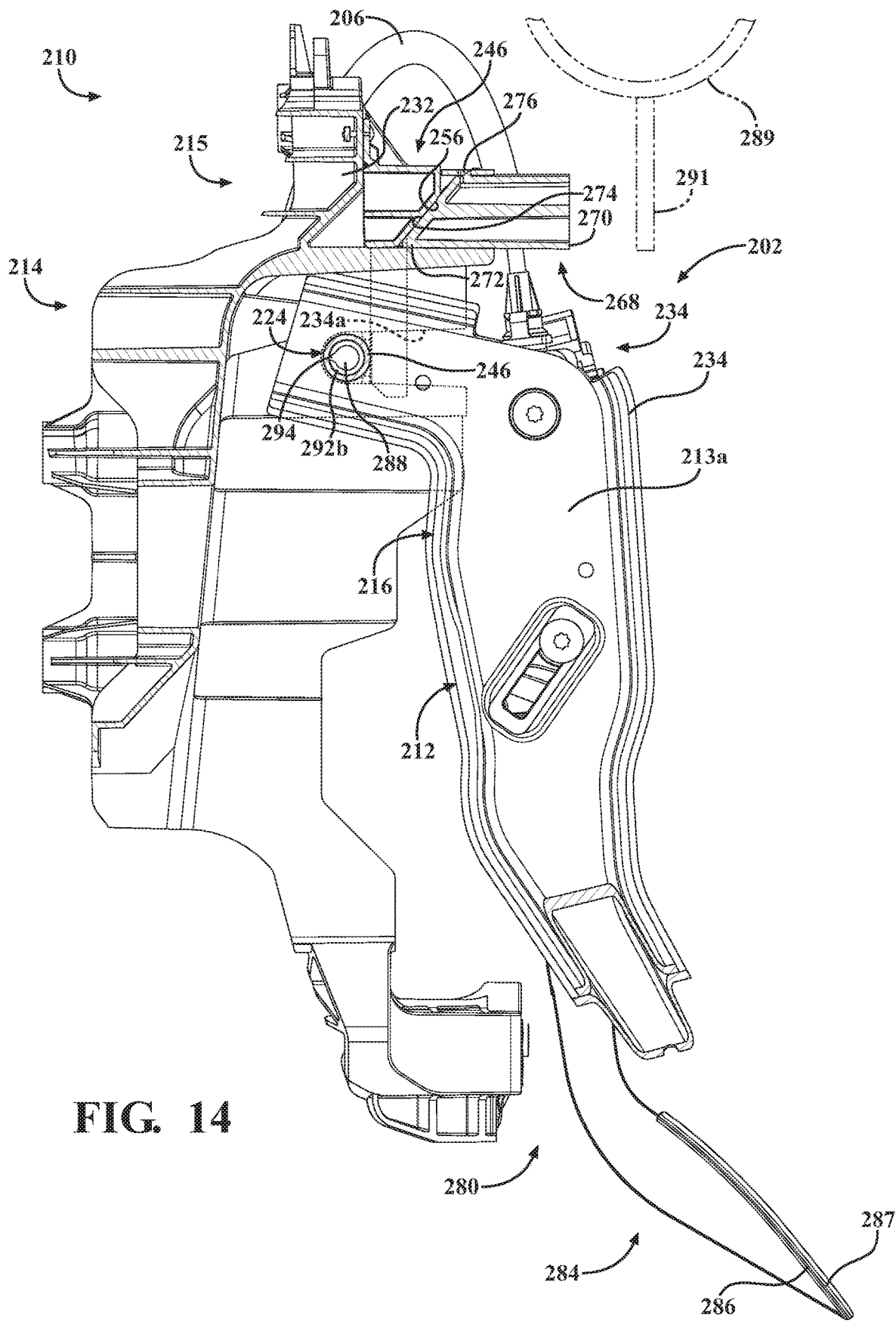
FIG. 14 schematically depicts a partial cross sectional view of the third example pedal assembly of FIG. 11 taken from line B-B in an operational position according to one or more embodiments shown and described herein.
Figure 15:
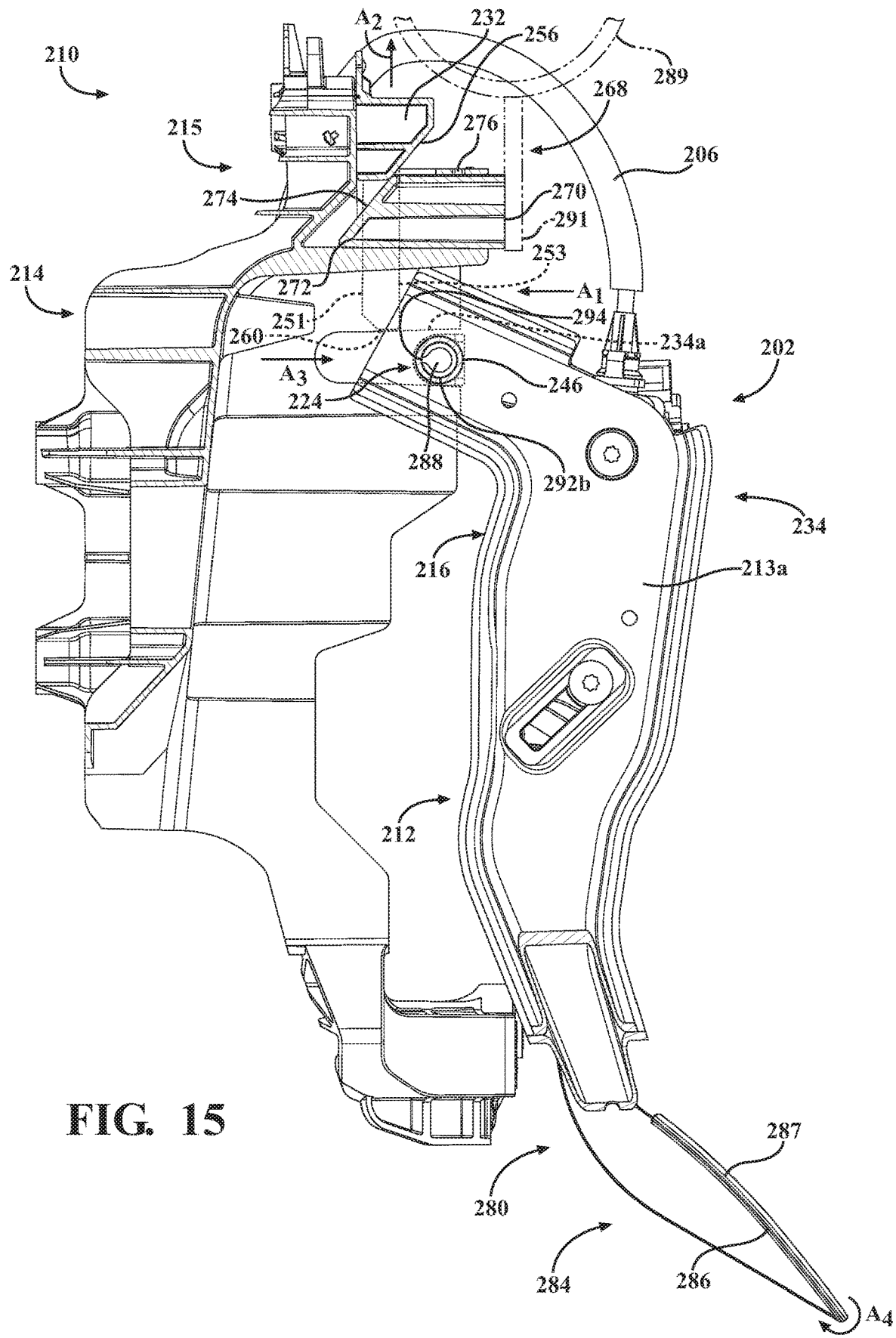
FIG. 15 schematically depicts a partial cross sectional view of the third example pedal assembly of FIG. 11 taken from line B-B in a disengaged position according to one or more embodiments shown and described herein.

In some embodiments, the upper portion 116 of the first pedal arm 112 includes a pair of protrusions 122 extending from each side surface 113a, 113b of the first pedal arm 112. In other embodiments, the upper portion 116 of the first pedal arm 112 includes a pair of recesses 288 (FIG. 13) positioned within each side surface 113a, 113b of the first pedal arm 112.

The housing 114 includes a rear wall 126a an opposite front wall 126b, a pair of sidewalls 126c, 126d extending between the rear wall 126a and the front wall 126b and an upper surface 128. It should be understood that the descriptions of the walls 126a, 126b, 126c, 126d and the upper surface 128 may be referenced by names that do not necessarily correspond to the actual position or location of the walls 126a, 126b, 126c, 126d and the upper surface 128. For example, the upper surface 128 may actually be orientated as a front wall, the rear wall 126a may be orientated as a top surface or top wall, and so on. As such, the descriptions of the walls 126a, 126b, 126c, 126d and the upper surface 128 is non-limiting.

In this embodiment, the upper surface 128 is a planar wall and the front wall 126b is an open top surface. That is, the front wall 126b does not have a planar wall surface. In some embodiments, portions of the rear wall 126a and the upper surface 128 is configured to be coupled to the vehicle such as to a portion of a firewall and/or to a portion of the instrument panel. The front wall 126b includes an elongated notch 130 that generally extends a length to the upper surface 128 such that a travel of the first pedal arm 112 is accommodated. The upper surface 128 includes a protrusion member 129 that extends from the upper surface 128. The protrusion member 129 includes an opening 131 and a slot 132 that generally extends vertically (i.e., parallel with the upper portion 116 of the first pedal arm 112) and in a lateral direction between the pair of sidewalls 126c, 126d. The front wall 126b of the housing 114 includes a channel 134 extending across the front wall 126b and between the pair of sidewalls 126c, 126d and extends from the front wall 126b towards the rear wall 126a. In some embodiments, the channel 134 is a pair of separate channels 134a, 134b. The front wall 126b further includes a cavity 136 that is positioned perpendicular to the slot 132 in a longitudinal direction. As such, the cavity 136 extends from the front wall 126b towards the rear wall 126a and the cavity 136 is arranged such that the cavity 136 is positioned below at least a portion of an upper surface 190 of the slot 132 in the vertical direction and is positioned above the channel 134 in the vertical direction. In some embodiments, the cavity 136 and/or the channel 134 extend in a direction that is perpendicular to the direction that the slot 132 extends.

In some embodiments, the upper portion 116 of the first pedal arm 112 is pivotally attached to the housing 114 via a pair of bushings 124 that are independent of the housing 114 and coupled to the pair of protrusions 122. The pair of bushings 124 each include an inside end 192a and an opposite outside end 192b, an upper surface 138 and a lower surface 140 forming an aperture 142 that extends between the inside end 192a and the outside end 192b. In some embodiments, the upper surface 138 is planar and the lower surface 140 is semi-circular. In other embodiments, the upper surface 138 may be arcuate and the lower surface 140 may be other shapes such as hexagonal, triangular, rectangular, and the like. Further, in some embodiments, the upper surface 138 does not extend the length of the lower surface 140 such that a pair of ears 196 or cut-ins are created. In some embodiments, the pair of bushings 124 further includes a plurality of protrusions 198 at or adjacent to the flange portion 144. The pair of ears 196 and/or the plurality of keys 198 act as keys to prevent the pair of bushings 124 from rotating within the channel 134 and/or from binding within the channel 134.

In some embodiments, the pair of bushings 124 are split 194 such that the lower surface 140 is separated into two half moon shapes. Further, each of the pair of bushings 124 may include a flange portion 144 that extends beyond the upper surface 138 and the lower surface 140 and is positioned between the inside end 192a and the outside end 192b. In some embodiments, an interior surface 145 of the flange portion 144 and the inside end 192a are in communication with each side surface 113a, 113b of the first pedal arm 112 respectively. In other embodiments, the interior surface 145 of the flange portion 144 and the inside end 192a are spaced apart from each side surface 113a, 113b of the first pedal arm 112 respectively.

Figure 6:
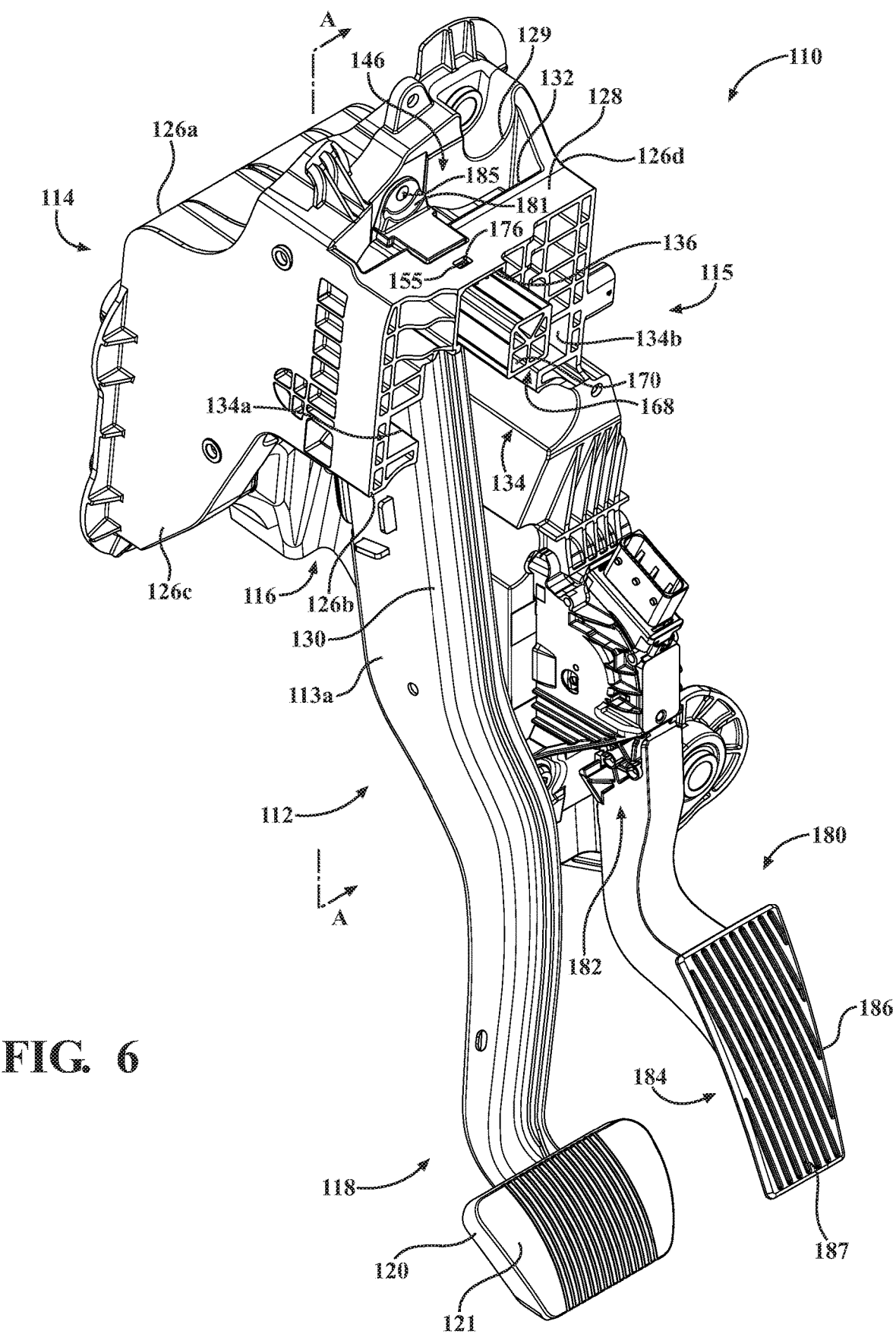
FIG. 6 schematically depicts a perspective view of a front and a side of a second example pedal assembly according to one or more embodiments shown and described herein.
Figure 7:
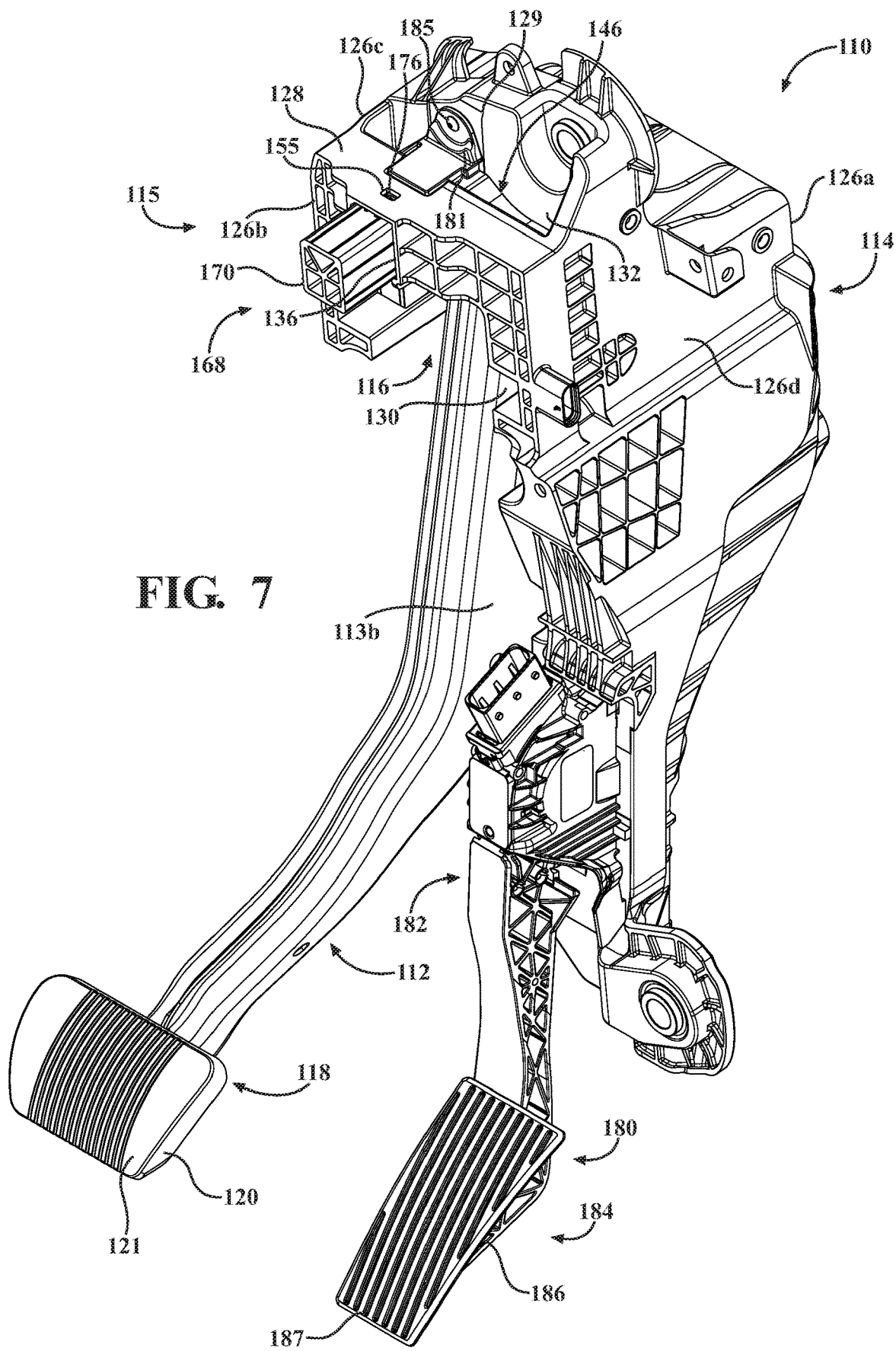
FIG. 7 schematically depicts a perspective view of a front and another side of the second example pedal assembly of FIG. 6 according to one or more embodiments shown and described herein.
Figure 8:
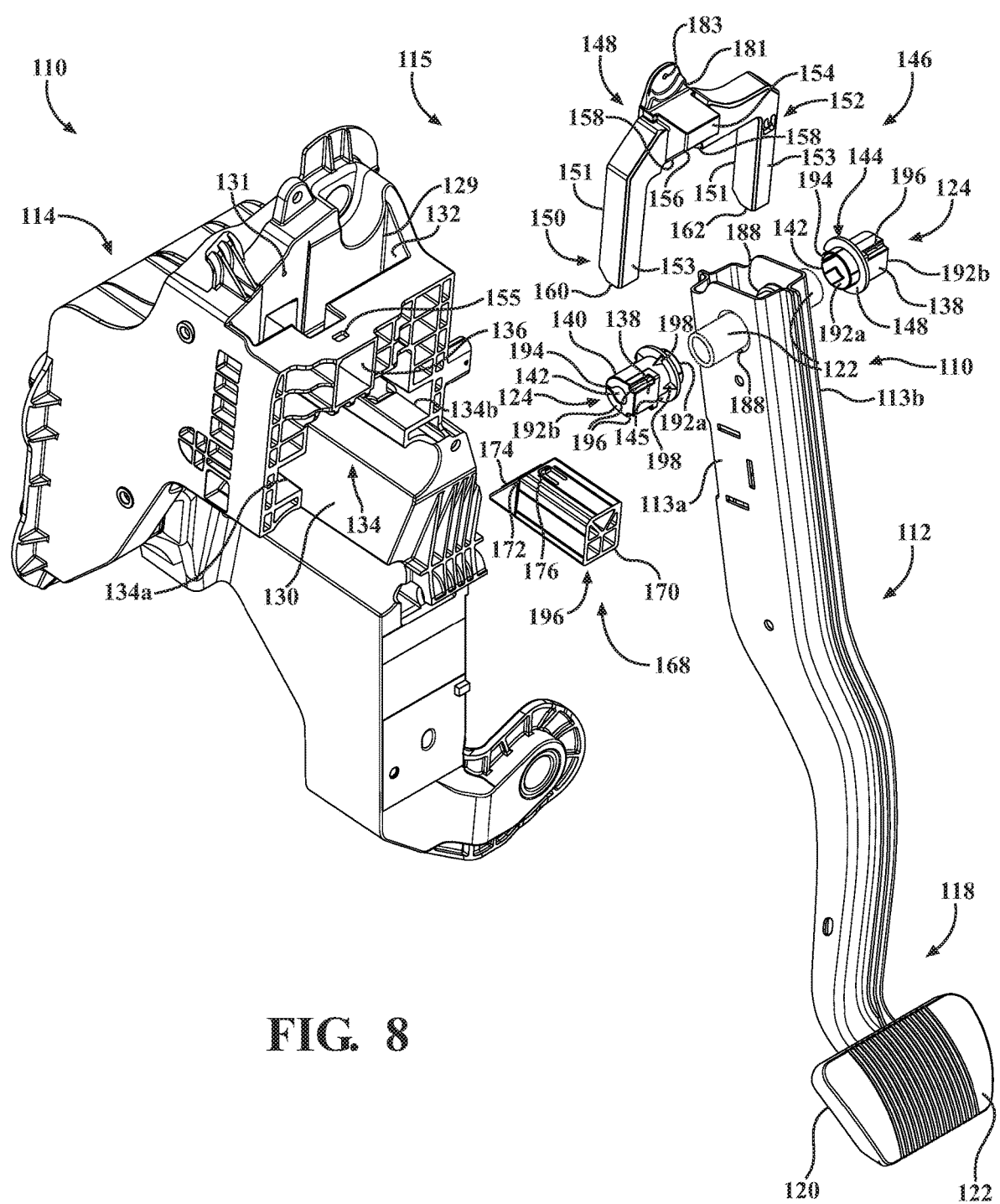
FIG. 8 schematically depicts a partial exploded view of the second example pedal assembly of FIG. 6 according to one or more embodiments shown and described herein.

In some embodiments, the pair of bushings 124 are slidably engaged with the pair of protrusions 122 such that the aperture 142 of the respective pair of bushings 124 receives the respective protrusion of the pair of protrusions 122. The pair of bushings 124 and the pair of protrusions 122 are positioned within the channel 134 when the second example pedal assembly 110 is in an operational position, as best seen in FIG. 6. That is, a portion the lower surface 140 and a portion of the flange portion 144 of the pair of bushings 124 are positioned in communication with the channel 134 to restrict or keep the pair of bushings 124 stationary within the channel 134 and permit the pair of protrusions 122 to rotate about the inside end 192a of the pair of bushings 124. As such, the first pedal arm 112 may travel the length of the elongated notch 130 such that the first pedal arm 112 pivots within the housing 114 during operation.

The second example pedal assembly 110 further includes the retaining member 146 that slidably engages within the slot 132 of the housing 114. In this embodiment, the base portion 148 includes a flange 181. The flange 181 includes a bore 183 that is configured for a fastener 185. In some embodiments, the fastener 185 may be a rivet, a bolt, a screw, and the like. Further, the fastener 185 may be determined based on a shear force, as discussed in greater detail herein. In the operational position, the bore 183 is aligned with the opening 131 such that the fastener 185 extends through the bore 183 into the opening 131. In other embodiments, the flange 181 is a tab that temporarily attaches the retainer member 146 to the protrusion member 129 such that upon an impact, the tab breaks a way to disconnect the retainer member 146 to the protrusion member 129.

In some embodiments, the first leg 150 and the second leg 152 extend vertically from the upper surface 128 when positioned within the slot 132 of the housing 114. As such, at least distal ends 160, 162 of each of the first leg 150 and the second leg 152 are positioned within the channel 134. In some embodiments, the distal ends 160, 162 are tapered. It should be appreciated that in the operational position, the distal ends 160, 162 of each of the first leg and second legs 150, 152 are in communication with the upper surface 138 with each respective bushing of the pair of bushings 124. That is, each of the first leg and second legs 150, 152 includes an interior surface 151 and an exterior surface 153 that define a thickness that retain the pair of bushings 124 into the channel 134 of the housing 114 while allowing the first pedal arm 112 to rotate about the inside end 192a. As such, in the operational position, at least the interior surface 151 of the distal ends 160, 162 of each of the first leg and second legs 150, 152 rest on the upper surface 138 of each respective bushing of the pair of bushings 124. This arrangement retains the pair of bushings 124 and the upper surface 118 of the first pedal arm 112 within the channel 134 of the housing 114 while permitting the first pedal arm 112 to pivot along the length of the elongated notch 130 during operation.

The block 168 of the second example pedal assembly 110 is received in the cavity 136 such that the first end 170 of the block 168 extends outwardly from the front wall 126b in the longitudinal direction when the second example pedal assembly 110 is in the operational position. Further, the first end 170 is configured to receive an impact to depress the block 168 within the cavity 136 of the housing 114. As such, the first end 170 may be positioned within an instrument panel 189 of the vehicle such that upon a vehicle impact, the instrument panel 189, or a portion thereof, contacts with the first end 170 of the block 168. In some embodiments, a flag 191 may make contact with the first end 170 of the block 168 to depress the block 168 within the cavity 136 of the housing 114.

The second end 172 includes the second angled portion 174, which is installed perpendicular to the retaining member 146 such that the second angled portion 174 is positioned directly below the first angled portion 156 in the vertical direction so to align the first angled portion 156 with the second angled portion 174. In some embodiments, the block 168 has retention tabs 176 positioned between the first and second ends 170, 172 to prevent the block 168 from backing out of the housing 114 prior to the application of an appropriately high force that would occur during the vehicle impact, as discussed in greater detail herein. In some embodiments, the upper surface 128 further includes an aperture 155 configured to receive the retention tab 176 to prevent the block 168 from moving prior to the impact on the first end 170, as discussed in greater detail herein.

Figure 10:
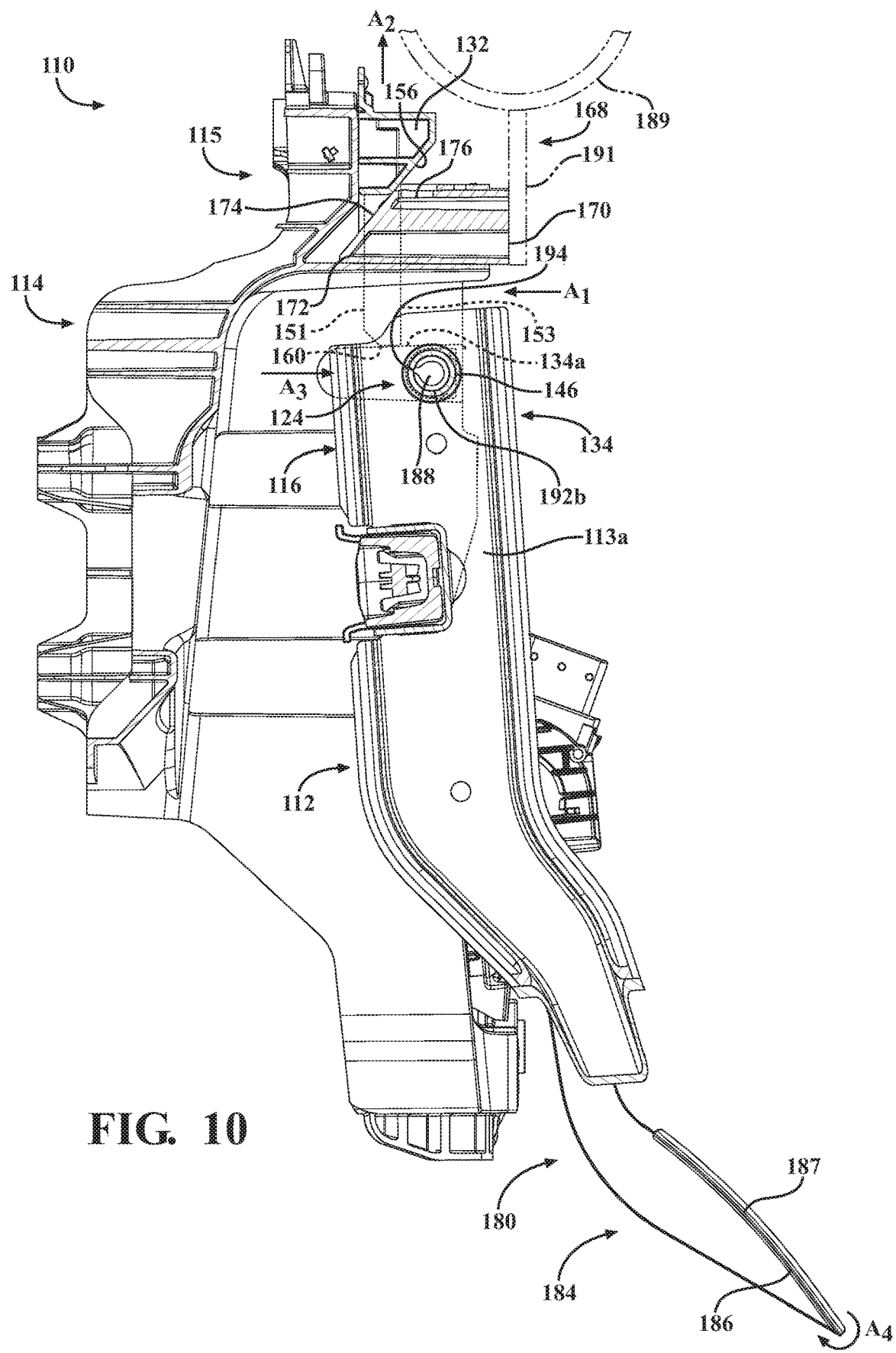
FIG. 10 schematically depicts a partial cross sectional view of the second example pedal assembly of FIG. 6 taken from line A-A in a disengaged position according to one or more embodiments shown and described herein.

Upon a depression of the first end 170 of the block 168 in the direction of arrow A1, (i.e. in the fore/aft direction and/or longitudinal direction) the second angled portion 174 rides along or travels the first angled portion 156 guided by the guide walls 158 to pivot, cam, and/or move the retaining member 146 in the direction A2 (i.e. in up/down direction and/or vertical direction) such that the fastener 185 is sheared allowing for the first and second legs 150, 152 to cam, move or travel in the direction of arrow A2 (i.e. in up/down direction and/or vertical direction). As such, the first and second legs 150, 152 move out of the channel 134 and away from the upper surface 138 of the pair of bushings 124, which allows the pair of bushings 124 and the upper portion 116 of the first pedal arm 112 to move or travel in the direction of arrow A3 (i.e. in the fore/aft direction and/or longitudinal direction) within the channel 134, as shown in FIG. 10. Upon continued pressure of the pedal pad 120 in the direction of arrow A4 (i.e. in the fore/aft direction and/or longitudinal direction), the upper portion 116 of the first pedal arm 112 pivots, moves and/or travels out of the channel 134 such that the first pedal arm 112 is moved into the disengaged position. That is, upon an impact of the first end 170 of the block 168 by the flag 191 and/or the instrument panel 189, the second angled portion 174 of the second end 172 slidably engages with the first angled portion 156 of the retaining member 146, which causes the retaining member 146 to pivot, cam and/or travel within the slot 132, shearing the fastener 178 and releasing the pair of bushings 124 and the upper portion 116 of the first pedal arm 112 from the channel 134 of the housing 114. In a non-limiting example, the force required to shear the fastener 178 is 1,500 Newton's under hot conditions and 2,000 Newton's under cold conditions. It should be appreciated that this is merely an example and that more or less Newton's may be required depending on the system.

Now referring to FIGS. 11-15, a third example pedal assembly 210 is schematically depicted. It is understood that the third example pedal assembly 210 is similar to the second example pedal assembly 110 with the exceptions of the features described herein. As such, like features will use the same reference numerals with a prefix "2" for the reference numbers. As such, for brevity reasons, these features will not be described again.

The third example pedal assembly 210 is an adjustable combination pedal assembly that includes a first pedal arm 212, a housing 214, a release mechanism 215 a second pedal arm 280, and a drive assembly 202. In some embodiments, the first pedal arm 212 may be a brake pedal and the second pedal arm 280 may be an accelerator pedal. It should be appreciated that this is a non-limiting example and the first pedal arm 212 may be a clutch pedal and the second pedal arm 280 may be a brake pedal, and the like. The second pedal arm 280 includes an upper portion 282 and an opposite lower portion 284. A pedal pad 286 is coupled to the lower portion 284. The pedal pad 286 has an elongated top surface 287 adapted to receive a foot of a driver. The upper portion 282 is in communication with the housing 214. In some embodiments, the upper portion 282 of the second pedal arm 280 acts as a living hinge with respect to the housing 214 such that the upper portion 282 pivots with respect to the housing 214 when a force is applied on the pedal pad 286, such as one caused by a driver's foot/leg.

The drive assembly 202 permits the first pedal arm 212 and/or the second pedal arm 280 to be adjustable between a plurality of adjustment positions relative to a stationary or fixed-position of the floorboard and/or firewall of the vehicle. The drive assembly 202 includes a first drive 203 longitudinally positioned in the first pedal arm 212, an electric motor 204 for rotating the first drive 203 and a second drive 207 longitudinally positioned in the second pedal arm 280. In some embodiments, the first drive 203 and/or the second drive 207 may each be a lead screw and/or a screw rod. The first and second drives 203, 207 may be an elongated shaft having a threaded portion adapted for cooperation with the electric motor 204. In some embodiments, the first and second drives 203, 207 are formed of resin such as, for example, nylon. In other embodiments, the first and second drives 203, 207 are formed of a metal such as, for example, steel. The first drive 203 is configured for rotation about a central longitudinal axis 205 and the second drive 207 is configured for rotation about a central longitudinal axis 208.

The electric motor 204 extends from the sidewall 226d of the housing and includes a plurality of gears and a flex cable 206 that connects an output shaft of the electric motor 204 to the first drive 203 and an output shaft of the electric motor 204 to the second drive 207 in a known manner. Moreover, it should be appreciated that the electric motor 204 may alternatively be coupled to anywhere else on the housing 214. Further, it should be appreciated that the drive assembly 202 may include more than one electric motor 204. That is, one motor may be dedicated to the first pedal arm 212 while additional motors may be dedicated to other pedals, such as the second pedal arm 280. The electric motor 204 may be connected to a suitable control circuit having operator input devices for selectively operating the electric motor 204 to position the first pedal arm 212 and the second pedal arm 280 between the plurality of adjustment positions.

The position of the first pedal arm 212 and the second pedal arm 280 may be adjusted by the driver of the vehicle in a forward-rearward direction between a plurality of adjustment positions. To adjust the forward-rearward position, the driver engages a control switch, which activates rotation of the electric motor 204 in the desired direction. Rotation of the electric motor 204 also rotates the first drive 203 via the flex cable 206 and the second drive 207. To return the first pedal arm 212 and the second pedal arm 282 to the previous position, the electric motor 204 rotates the first drive 203 via the flex cable 206 and the second drive 207 in the opposite direction to move the components in the opposite direction as described above.

In some embodiments, the upper portion 216 of the first pedal arm 212 is pivotally attached to the housing 214 via a pair of bushings 224 that are independent of the housing 214 and coupled to a pair of recesses 288. The pair of bushings 224 each include an inside end 292a and an opposite outside end 292b, an upper surface 238 and a lower surface 240 forming an aperture 242 that extends between the inside end 292a and the outside end 292b. In some embodiments, the upper surface 238 is planar and the lower surface 240 is semi-circular. In other embodiments, the upper surface 238 may be arcuate and the lower surface 240 may be other shapes such as hexagonal, triangular, rectangular, and the like. Further, in some embodiments, the upper surface 238 does not extend the length of the lower surface 240 such that a pair of ears 296 or cut-ins are created. In some embodiments, the pair of bushings 224 further includes a plurality of protrusions 298 at or adjacent to the flange portion 244. The pair of ears 296 and/or the plurality of keys 298 act as keys to prevent the pair of bushings 224 from rotating within the channel 234 and/or from binding within the channel 234.

In some embodiments, the pair of bushings 224 are split 194 such that the lower surface 240 is separated into two half moon shapes. Further, each of the pair of bushings 224 may include a flange portion 244 that extends beyond the upper surface 238 and the lower surface 240 and is positioned between the inside end 292a and the outside end 292b. In some embodiments, an interior surface 245 of the flange portion 244 and the inside end 292a are in communication with each side surface 213a, 213b and the pair of recesses 288 of the first pedal arm 112 respectively.

Figure 11:
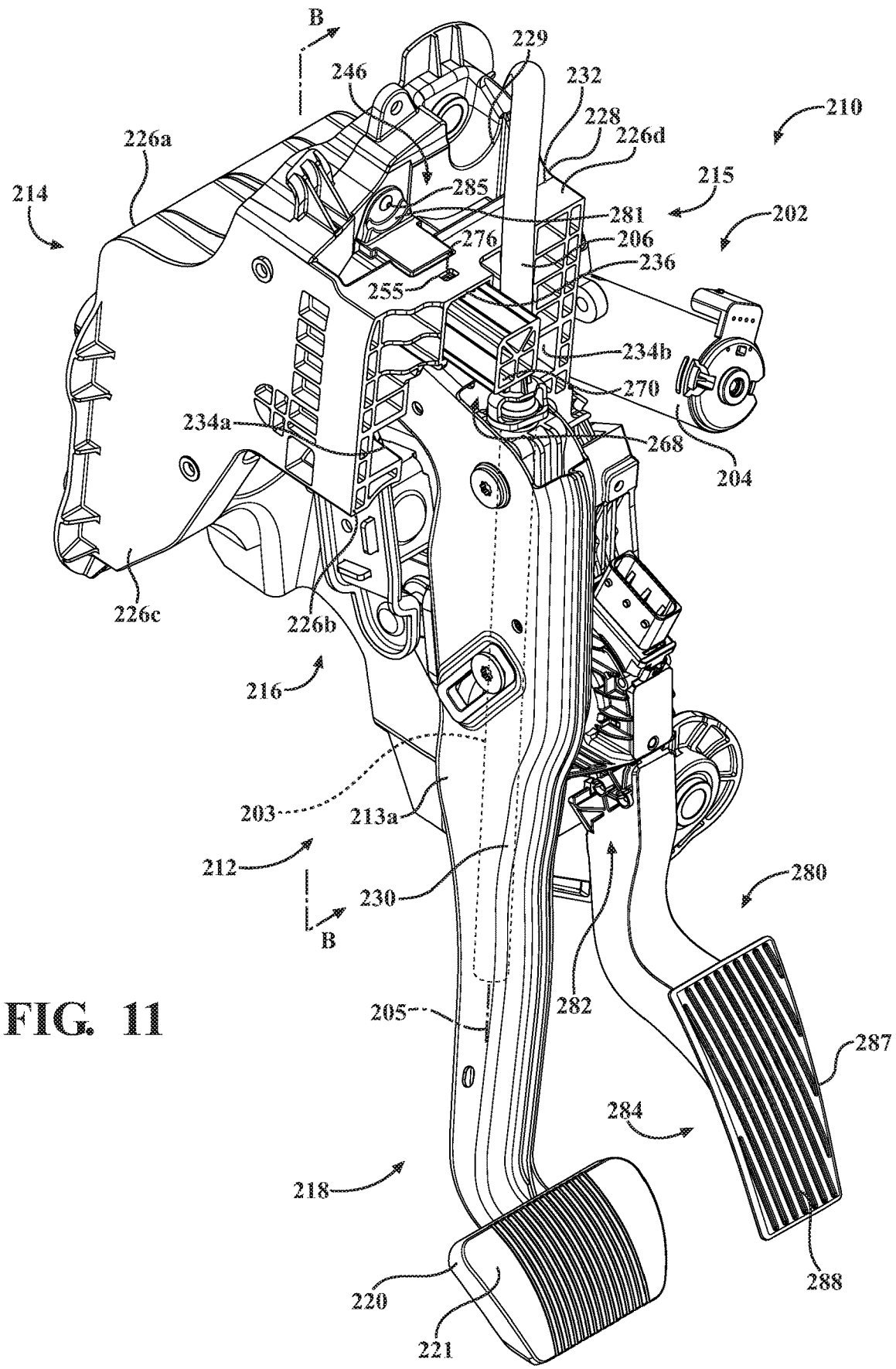
FIG. 11 schematically depicts a perspective view of a front and a side of a third example pedal assembly according to one or more embodiments shown and described herein.
Figure 12:
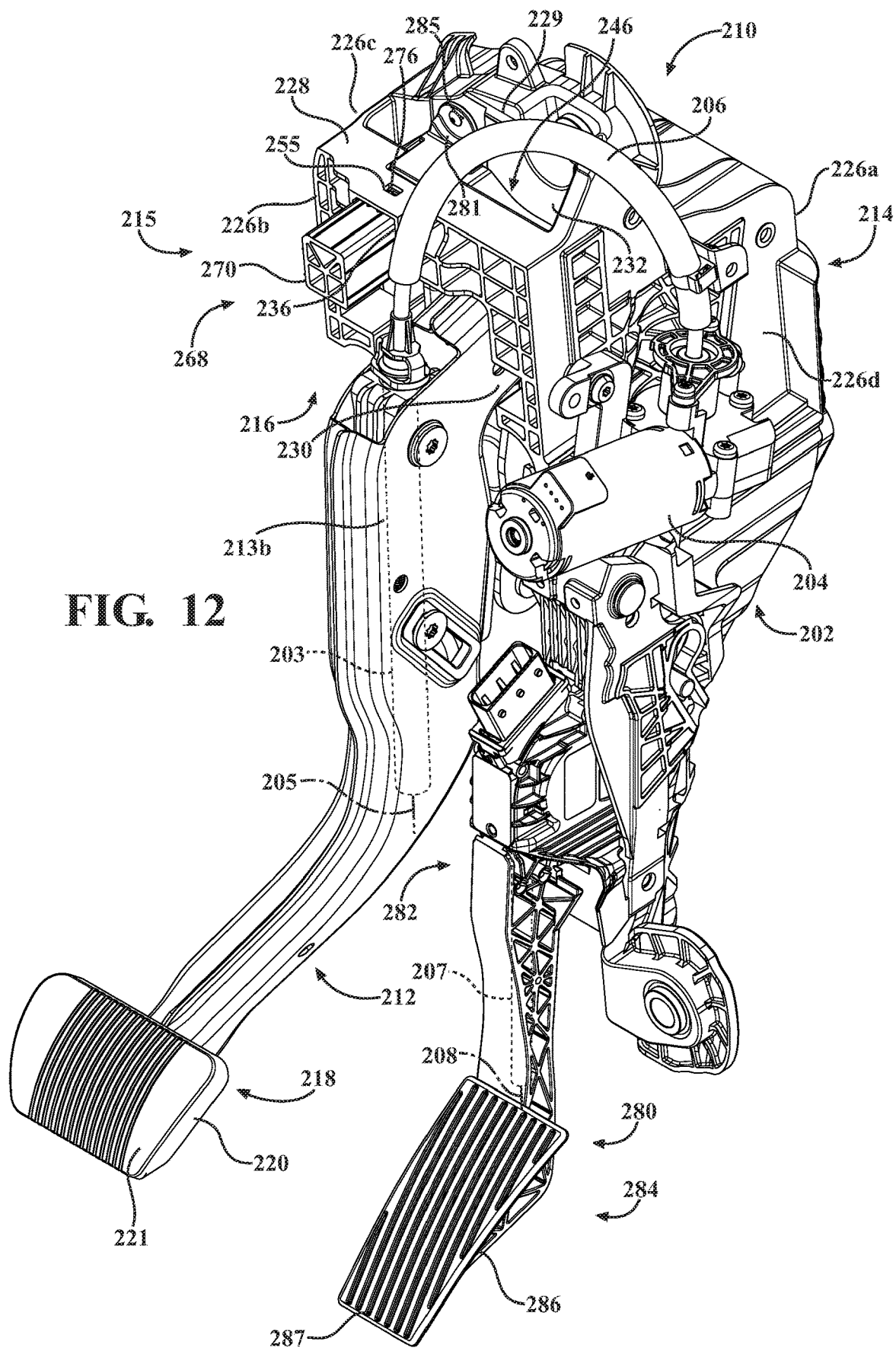
FIG. 12 schematically depicts a perspective view of the front and another side of the third example pedal assembly of FIG. 10 according to one or more embodiments shown and described herein.

In some embodiments, the pair of bushings 224 and the pair of recesses 288 are positioned within the channel 234 when the third example pedal assembly 210 is in an operational position, as best seen in FIG. 11. That is, a portion the lower surface 240 and a portion of the flange portion 244 of the pair of bushings 224 are positioned in communication with the channel 234 to restrict or keep the pair of bushings 224 stationary within the channel 234 and permit the pair of recesses 288 to rotate about the inside end 292a of the pair of bushings 224. As such, the first pedal arm 212 may travel the length of the elongated notch 230 such that the first pedal arm 212 pivots within the housing 214 during operation.

It should be appreciated that embodiments of the present disclosure are directed to a pedal assembly that includes a release mechanism to mechanically disengage an upper portion of a pedal arm from a housing to allow the upper portion of the pedal arm to pivot out of the housing upon an impact. As such, the pedal arm is moved from an operational position to a disengaged position, in which the operational position is a normal position for the pedal arm and the disengaged position is where the pedal arm is moved from an undesirable position during an vehicle impact to a more desirable position during the vehicle impact. In some embodiments, the desirable position during an impact may be out of the housing and on a floorboard of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pedal assembly comprising:
a housing;
a pedal arm having an upper end pivotally coupled to the housing;
a retaining member slidably engaged within the housing, the retaining member having a first ramp portion relative to an upper surface of the retaining member, a portion of the retaining member in communication with the upper end of the pedal arm; and
a block slidably mounted within the housing and perpendicular to the first ramp portion of the retaining member, the block having a second ramp portion relative to a sidewall surface of the block, the second ramp portion is complimentary sloped to the first ramp portion,
wherein upon an impact, the second ramp portion of the block slidably engages with the first ramp portion which causes the retaining member to move and release the upper end of the pedal arm from the housing.

2. The pedal assembly of claim 1, wherein a portion of the block extends beyond the housing to make contact with a portion of an instrument panel upon the impact.

3. The pedal assembly of claim 1, wherein the retaining member is generally U-shaped having a base portion connecting a first leg spaced apart from a second leg.

4. The pedal assembly of claim 3, wherein the first ramp portion of the retaining member is positioned within an upper surface of the base portion.

5. The pedal assembly of claim 3, wherein:
the housing further includes a channel; and
a pair of bushings are each in communication with the upper end of the pedal arm, the pair of bushings are positioned within the channel.

6. The pedal assembly of claim 5, wherein each one of the pair of bushings have an upper surface and each respective upper surface is in communication with the respective first leg and the second leg of the retaining member.

7. The pedal assembly of claim 5, wherein upon the impact, the second ramp portion of the block slidably engages with the first ramp portion to cause the first leg and the second leg to displace which releases each one of the pair of bushings and the upper end of the pedal arm from the channel of the housing.

8. The pedal assembly of claim 5, wherein each one of the pair of bushings are keyed to inhibit rotation within the channel.

9. The pedal assembly of claim 1, further comprising:
a second pedal arm having a second upper end, the second upper end pivotally coupled to the housing.

10. A pedal assembly having impact features, the pedal assembly comprising:
a housing having a slot, a cavity, and a channel;
a pedal arm having an upper end, the upper end pivotally coupled to the housing within the channel;
a retaining member slidably engaged with the slot and positioned at least partially within the housing, the retaining member having a first ramp portion relative to an upper surface of the retaining member, the retaining member is in communication with the upper end of the pedal arm; and
a block slidably mounted within the cavity of the housing and positioned perpendicular to the retaining member, the block having a second ramp portion relative to a sidewall surface of the block, the second ramp portion is complimentary sloped to the first angled portion,
wherein upon an impact, the second ramp portion of the block slidably engages with the first ramp portion which causes the retaining member to move within the slot and releases the upper end of the pedal arm from the channel of the housing.

11. The pedal assembly of claim 10, wherein the slot extends in a perpendicular direction with respect to the channel and the cavity.

12. The pedal assembly of claim 10, wherein the retaining member is generally U-shaped having a base portion connecting a first leg spaced apart from a second leg.

13. The pedal assembly of claim 12, wherein the base portion further includes a fastener that couples the retaining member to the housing, the fastener is configured to sheer when a predetermined amount of force is applied to the retaining member via the block.

14. The pedal assembly of claim 13, wherein the first ramp portion of the retaining member is positioned within an upper surface of the base portion.

15. The pedal assembly of claim 13, further comprising:
a pair of bushings positioned within the channel and in communication with the upper end of the pedal arm within the channel.

16. The pedal assembly of claim 15, wherein each one of the pair of bushings have an upper surface and each respective upper surface is in communication with the respective first leg and the second leg of the retaining member.

17. The pedal assembly of claim 16, wherein upon an impact, the second ramp portion of the block slidably engages with the first ramp portion to cause the first leg and the second leg of the retaining member to release each one of the pair of bushings and the upper end of the pedal arm from the channel of the housing.

18. The pedal assembly of claim 15, wherein each one of the pair of bushings are keyed to inhibit rotation within the channel.

19. The pedal assembly of claim 10, further comprising:
a second pedal arm having a second upper end, the second upper end pivotally coupled to the housing.

20. The pedal assembly of claim 19, wherein the pedal arm and the second pedal arm are adjustable between a plurality of positions by a motor.

* * * * *